(12) United States Patent
Argoitia

(10) Patent No.: US 8,241,748 B2
(45) Date of Patent: *Aug. 14, 2012

(54) HIGH CHROMA OPTICALLY VARIABLE COLOR-SHIFTING STRAND AND WOVEN PRODUCTS

(76) Inventor: Alberto Argoitia, Santa Rosa, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 12/556,746

(22) Filed: Sep. 10, 2009

(65) Prior Publication Data

US 2009/0324856 A1 Dec. 31, 2009

Related U.S. Application Data

(60) Continuation-in-part of application No. 11/363,420, filed on Feb. 27, 2006, now Pat. No. 7,608,330, and a continuation-in-part of application No. 11/028,819, filed on Jan. 4, 2005, now Pat. No. 7,300,695, which is a division of application No. 10/243,111, filed on Sep. 13, 2002, now Pat. No. 6,902,807.

(60) Provisional application No. 60/668,852, filed on Apr. 6, 2005, provisional application No. 60/694,407, filed on Jun. 27, 2005.

(51) Int. Cl.
*B32B 5/16* (2006.01)
*B32B 33/00* (2006.01)

(52) U.S. Cl. ........ 428/365; 428/372; 428/373; 428/374; 428/375; 428/377; 428/401; 428/403

(58) Field of Classification Search .................. 428/402, 428/403, 365, 372–375, 377, 401; 359/580
See application file for complete search history.

(56) References Cited

U.S. PATENT DOCUMENTS

| | | | | |
|---|---|---|---|---|
| 5,974,150 | A | 10/1999 | Kaish et al. | 713/179 |
| 6,013,370 | A * | 1/2000 | Coulter et al. | 428/403 |
| 6,235,105 | B1 * | 5/2001 | Hubbard et al. | 106/415 |
| 6,749,777 | B2 * | 6/2004 | Argoitia et al. | 252/582 |
| 7,608,330 | B2 * | 10/2009 | Argoitia et al. | 428/403 |

OTHER PUBLICATIONS

I.M. Boswarva et al, "Roll coater system for the production of optically variable devices (OVD's) for security applications" Proceedings of the 33rd. Annual Society of Vacuum Coaters Technical Conference, p. 103-109 (1990).

* cited by examiner

*Primary Examiner* — Hoa (Holly) Le
(74) *Attorney, Agent, or Firm* — Matthew A. Pequignot; Pequignot + Myers LLC

(57) ABSTRACT

Opaque color shifting strands are disclosed that have an optically variable color with a change in angle of incident light. The strands have an organic substrate and an optical interference structure on one or both sides of the organic substrate. The optical interference design can be a Fabry-Perot structure or can be optically variable ink. Plural strands can be combined to form a textile for example such as a garment label.

17 Claims, 10 Drawing Sheets

HIGH CHROMA OPTICALLY VARIABLE COLOR-SHIFTING STRAND AND WOVEN PRODUCTS

CROSS-REFERENCE TO RELATED APPLICATIONS

The present invention claims priority from U.S. patent application Ser. No. 11/363,420 filed Feb. 27, 2006, now U.S. Pat. No. 7,608,330, which claims priority from U.S. Patent Application No. 60/668,852 filed Apr. 6, 2005 and U.S. Patent Application No. 60/694,407 filed Jun. 27, 2005, which are incorporated herein by reference for all purposes. U.S. patent application Ser. No. 11/363,420 filed Feb. 27, 2006, now U.S. Pat. No. 7,608,330, is a continuation-in-part of U.S. patent application Ser. No. 11/028,819 filed Jan. 4, 2005, which is a divisional application of U.S. patent application Ser. No. 10/243,111, filed on Sep. 13, 2002, now U.S. Pat. No. 6,902,807, which are incorporated herein by reference for all purposes.

FIELD OF THE INVENTION

This invention relates to opaque, optically variable color-shifting strands useful in weaving textiles for producing appealing interwoven color-shift effects.

BACKGROUND OF THE INVENTION

Color-shifting foil and wide security threads used in banknotes are known primarily for use in the security industry; for example foils are used either their ability to produce color-shifting flakes or as is to produce various security documents. Color-shifting foil is also used for decorative purposes. In some instances sheets of opaque foil are bonded to other articles to provide enhancement or security features. Thread that is embedded or laminated as a single strand into a banknote provides a way in which the bank note or document can be authenticated. However banknote threads of the type used in Canadian currency are visible from a single side and provide a color shift on a single side of the banknote. Only one color in a given instant is visible to a viewer as the thread is essentially planar. As the banknote is tilted with respect to the viewer, the color changes and a color shift occurs.

U.S. Pat. No. 5,974,150 teaches the weaving of dichroic fibers to make a label having security features.

The term color-shifting textile used hereafter is to refer to as being a material made of plural color-shifting strands that are woven, knitted, knotted, or braided, and wherein the plural strands, essentially form the fabric, or a single strand that is woven into several rows of a warp in an alternating fashion.

In most applications where it is desirable to provide a color-shifting appearance, the color-shifting effect is either applied by way of coating the article with a paint or ink containing color-shifting flakes or alternatively by adhering a sheet of color-shifting foil to the article.

Although these methods serve their purpose, it is desired to fabricate an article out of color-shifting strands which are durable and which exhibit a color shift from either side.

It is an object to provide color-shifting strands, whereby the strands serve as plural rows of a weft and can be woven into a warp to yield an integral color-shifting article, and whereby the color-shifting strands form the article itself.

The color-shifting material may be a single strand of material having sufficient strength or may be itself be combined with other strands to provide a stronger material, such as formed into combined threads producing yarn, string or rope with color-shifting effects.

Continuous work is ongoing to improve the appearance and performance of coatings. Opaque, inorganic based color-shifting Fabry-Perot structures have been used for years and have excellent color-shifting visual effects. Foils having a release layer coated with thin film coatings are often used to harvest flakes from the coated substrate. Typically, structures of this type in the form of foils are made by depositing upon a substrate coated with a release layer, a reflector layer, followed by a dielectric layer followed by an absorber layer. These opaque foils appear highly reflective from one side due to the presence of a reflector layer and appear highly reflective with a color that changes in an angle dependent manner when viewed from the opposite side due to the Fabry-Perot structure. Foil can be comprised of a substrate coated on both sides with a symmetric Fabry-Perot structures of the type Ref/Diel/Abs.

Although such foil coated on a single or both sides is very useful for example in the making of flakes, or simply as a decorative foil, this invention provides products heretofore not known which are useful as threads such as threads in banknotes or narrower threads or strands for weaving into a textile.

In a preferred embodiment a strand is formed from an elongate strands of foil that are less than 500 microns in width which serve as single strand yarn or can be combined into multiple strand yarn for weaving a textile product such as a color-shifting label.

In accordance with this invention a high quality strand having a required strength is provided providing a high degree of chroma and strong color-shifting effects seen from either side, when the object or light source upon the object is moved.

In accordance with this invention, an opaque color-shifting strand is provided, wherein the structure comprises an organic support layer and; a) a single or double period Fabry-Perot structure on a single side of the organic support layer, or, b) two single or a double period Fabry-Perot structure sharing the same reflector layer on one side of an organic support layer or c) an optically variable color-shift ink on one side of an organic support layer.

In accordance with an aspect of this invention these strands preferably each have width "w" of less than 500 microns, and a thickness "t" of more than 6 microns. The organic support layer provides rigidity for preventing the color-shift coating from curling, for allowing precise cutting of the strand substrate into discreet strands of a predetermined size and or lessening chipping and breaking of the interference coatings.

In an alternative embodiment, the opaque color-shifting strand is embossed with a diffractive microstructure providing a strand that shows opaque color-shifting by thin film and diffractive light interference simultaneously. This combined interference is disclosed in U.S. Pat. No. 6,841,238 related to chromatic pigments and foils.

In accordance with an aspect of this invention, an opaque color-shifting woven structure is provided, comprising a plurality of color-shifting strands, wherein the strands each comprise an organic support layer carrying on one side or each side thereof, a reflector layer, a dielectric layer and an absorber layer, said strands each having an width of less than 500 microns, and a thickness of more than 6 microns, the organic support layer providing rigidity for preventing the strands from curling and for lessening chipping and breaking of the strands.

In accordance with this invention a color-shifting product is provided wherein the product is comprised of a plurality of interwoven color-shifting strands, and wherein the product has a greater tensile strength than is obtained from a single strand of color-shifting material and wherein different colors from different strands are seen simultaneously.

In accordance with the invention an interwoven color-shifting textile is provided comprising plural color-shifting strands forming a weft supported by a warp.

SUMMARY OF THE INVENTION

In accordance with the invention there is provided an opaque color-shifting element comprising:
a color-shifting strand cut such that its width is substantially less than it's length, the strand comprising an inorganic thin film optical interference structure providing a perceivable color-shift with a change in viewing angle or angle of incident light, in the visible spectrum, wherein said inorganic thin film interference structure of the color-shifting strand is supported by an organic support layer for providing rigidity and for preventing the strand from significantly curling, and wherein the inorganic thin film interference structure is permanently coated onto the substrate in the absence of a release layer.

BRIEF DESCRIPTION OF THE DRAWINGS

Exemplary embodiments of the invention will now be described in conjunction with the drawings. For ease of illustration, the figures show only a small segment of a color-shifting strand, where the actual strand has length significantly longer than its width or thickness.

DETAILED DESCRIPTION

Figure 1:
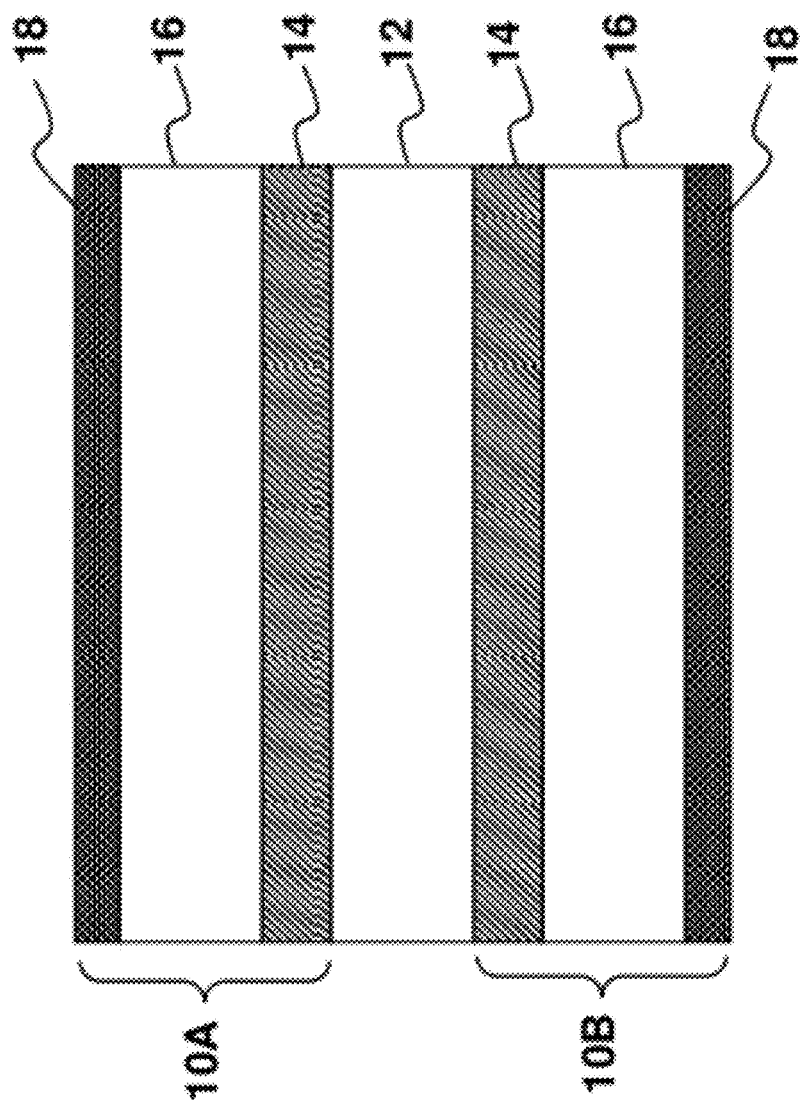
FIG. 1 shows a small segment of a color-shifting strand with an un-symmetrical single period Fabry-Perot filter on both sides of an organic support layer.

Turning now to FIG. 1 a color-shifting strand is shown which has been mechanically cut to a predetermined size and shape such that the width is at less than 500. The strand is comprised of two single-period Fabry-Perot structures 10a and 10b deposited on opposite sides of an organic support layer 12 which may be transparent or opaque. The Fabry-Perot structures are deposited on the substrate in the absence of a release layer so that the color shifting structures remain on the substrate permanently. The single-period Fabry-Perot structures 10a and 10b each have a reflective layer 14, a dielectric layer 16 and an absorber layer 18 deposited upon the organic substrate 12 which is considerably thicker than each of the layers 14, 16, or 18 deposited thereon. The embodiments exemplified in the structures shown in FIGS. 1 through 4, and FIGS. 6 and 7 can be made in a vacuum roll coater using a flexible transparent or opaque sheet of organic material. Transparency or opaqueness of the substrate depends on whether viewing through the supporting substrate is required to see the optically variable coating. Typically, 1 mil polyester is used as a support substrate 12; however, other organic webs and other thicknesses can be used. Organic webs can include polyethylene terephthalate, polyethylene, oriented polypropylene, polycarbonate, poly vinylbutyal, polyhexadiene, and polyimide. Alternatively, webs that do not require transparency may be used however the web should be able to be cut into strands suitable for weaving. The thickness of the web or substrate may range from 0.5 mil to 5 mil.

Vacuum roll coating techniques are well known, and in particular, optically variable thin film production in a vacuum roll coater is also known. I. M. Boswarva et al, in Proceedings of the 33rd. Annual Society of Vacuum Coaters Technical Conference, held in New Orleans, La. USA., p. 103-109 (1990), incorporated herein by reference, describes the making of optically variable coatings based on an all dielectric design, on plastic webs. Coatings were made of ZrO2 and SiO2 layers deposited onto a release coated carrier web and then removed by a UV cure adhesive to form optically variable patches on Canadian bank notes. These patches were about one half-inch square.

In contrast, to typical woven articles, which have an inherent color or are printed upon, the optically variable strands in accordance with this invention provide a color-shift with viewing angle, and furthermore the product woven with the color-shifting strands produce interesting effects not seen in a color-shifting foil.

Figure 8:
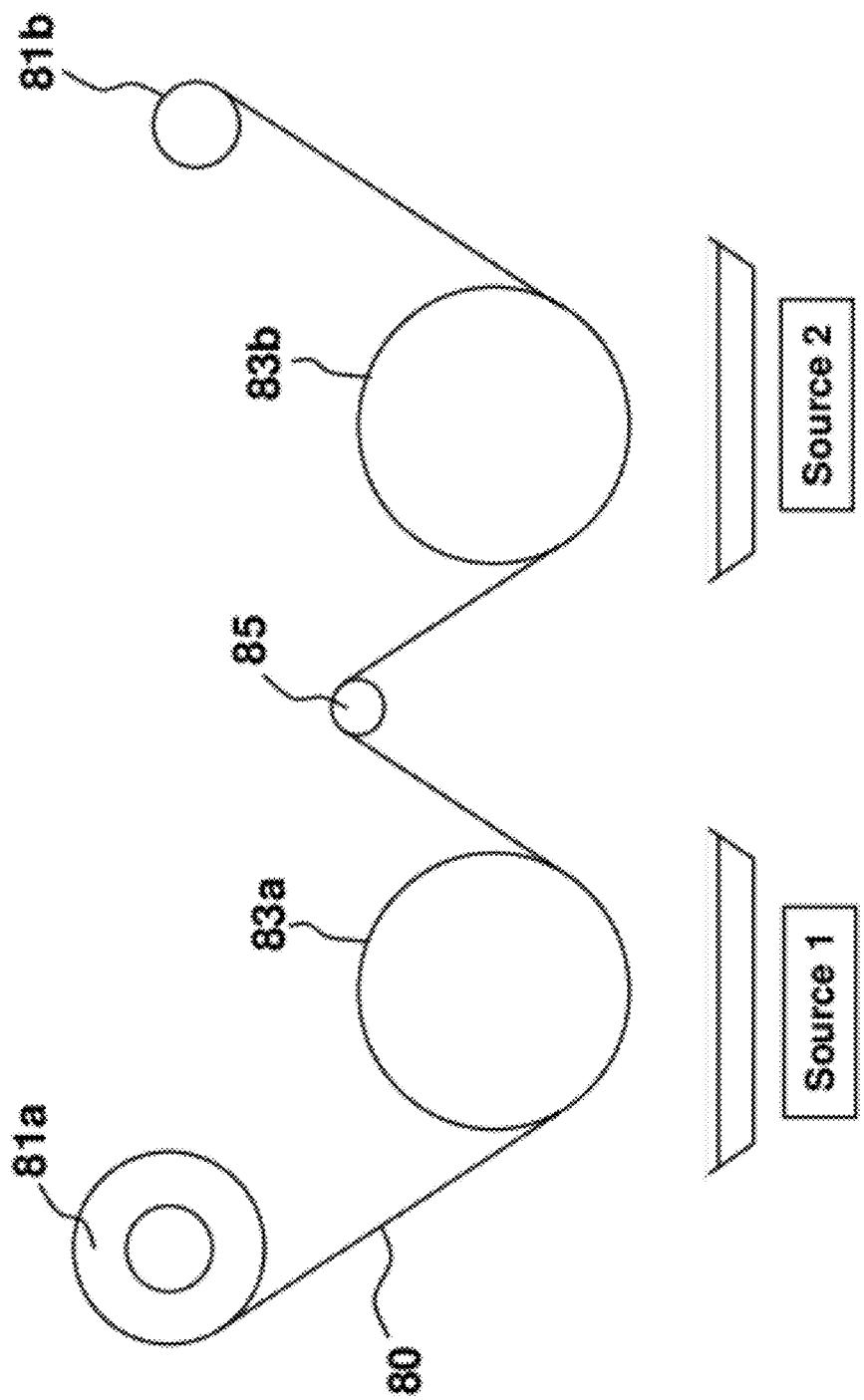
FIG. 8 is a diagram illustrating a two drum vacuum roll coater schematic that shows coating sources under each cooled drum.

In a preferred embodiment a roll-to-roll a double deposition system can be employed as shown in FIG. 8 wherein simultaneous deposition of the absorber, dielectric and reflector layers can be achieved.

By forming a sheet that having one of the structures shown in FIGS. 1-7, the sheet material can be cut into strips to form strands of a desired width and length. Here one simply removes the roll from the coating chamber and cuts the web into strands by using cutting machines. The coating on the substrate is permanently coated thereon.

Applications for optically variable color-shifting strands include any woven product, by way of example, from labels to high-end furniture, or toys.

Figure 2:
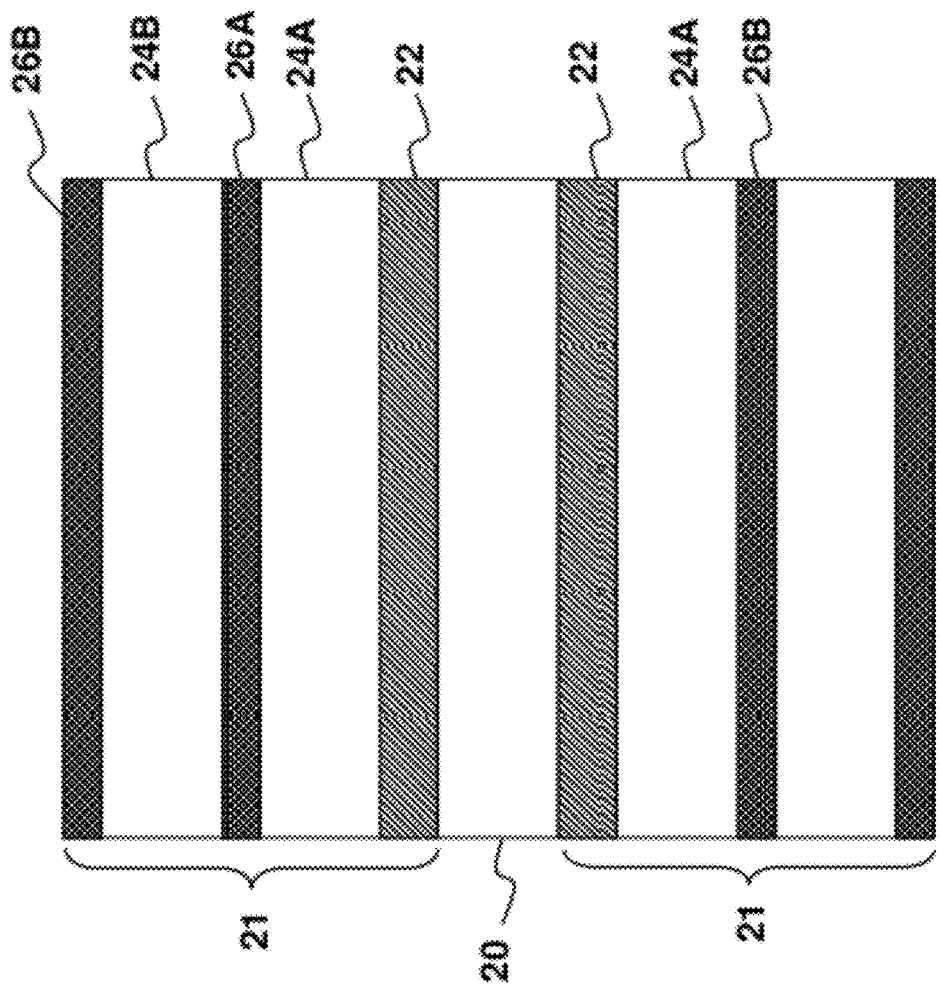
FIG. 2 shows a small segment of a color-shifting strand with an un-symmetrical double period Fabry-Perot filter on both sides on an organic support layer.

Turning now to FIG. 2 a strand is shown with two double period Fabry-Perot structures 21 each side of a central organic support layer 20 which may be transparent or opaque. Each Fabry-Perot structure consists of a reflector 22, dielectric spacers 24a and 24b, and two absorber layers 26a and 26b. FIG. 2 and FIG. 1 are quite different in that the double cavity makes colors that are not possible with a single cavity. There is peak suppression in the spectra for a double cavity allowing higher chroma in structures shown in 2 than those in FIG. 1.

Figure 3:
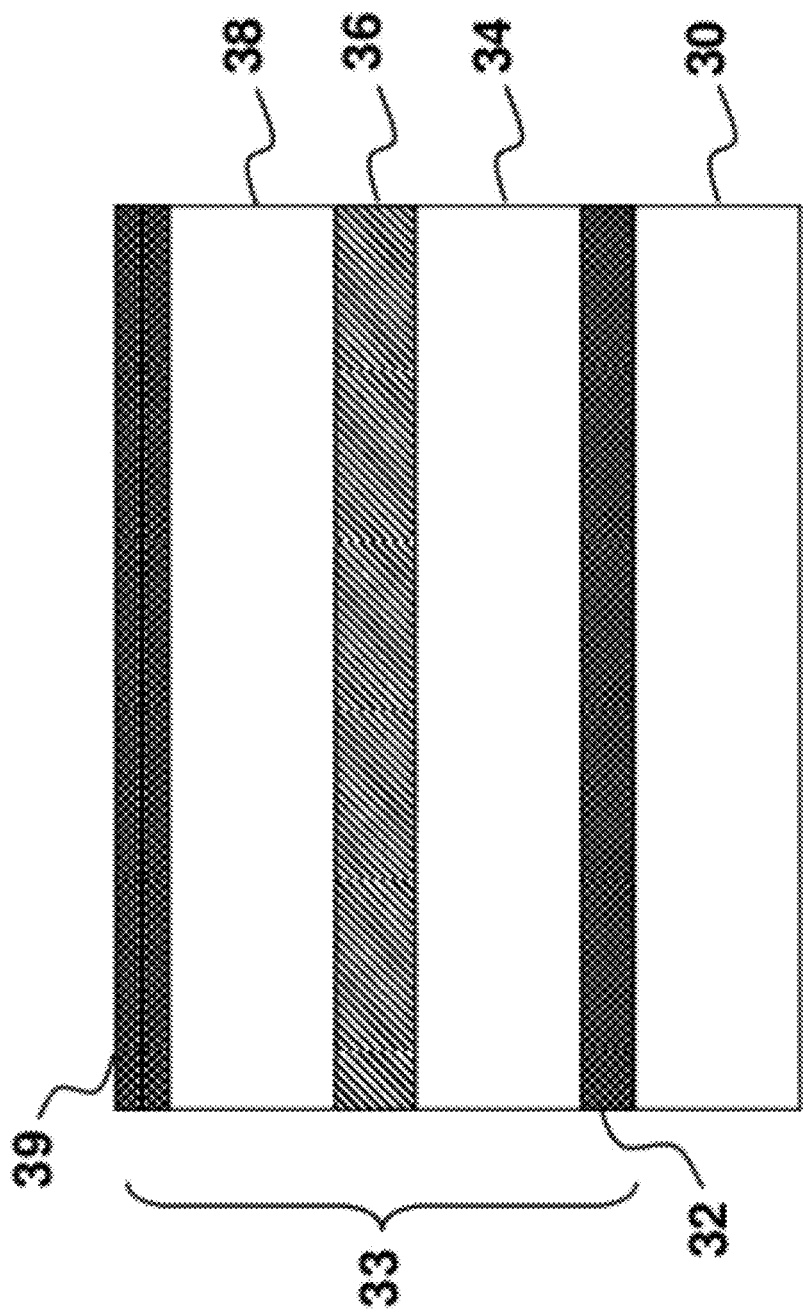
FIG. 3 shows a small segment of a color-shifting strand of this invention with two single Fabry-Perot structures on the one side of a transparent organic support layer where the two Fabry-Perot structures share a common reflector layer.

An alternative and preferred embodiment is shown in FIG. 3 wherein a color-shifting strand is shown with two single Fabry-Perot structures 33 sharing the same reflector on one side of a transparent organic support layer 30. An absorber layer 32 is deposited upon the substrate and a dielectric spacer layer 34, reflector layer 36 dielectric spacer layer 38 and absorber 39 are deposited upon one another over layer 32. This asymmetrical strand is optically variable when viewed from either side of a transparent support layer but in the case of an opaque support layer one would see an optically variable effect with reduced brightness. In the latter case, some strands would be oriented with the opaque side to the viewer whereas other strands would be oriented with the optically variable coating to the observer. This embodiment offers significant advantages over other embodiments described. By permanently coating a single side of the light transmissive substrate which is essentially transparent with two back to back Fabry-Perot structures color shift can be seen from both sides. Of course this is done in the absence of a release layer which is not required, since the coating is to be permanent. Coating a single side of the substrate is cost advantageous and significantly easier than coating both sides, and since the color shift is seen through the substrate, the strand, ribbon or thread displays well from both sides. Providing two Fabry-Perot structures which share a reflector layer offers a cost savings and makes the device less complex, rather than providing two distinct 3-layer Fabry-Perot back-to-back structures. Notwithstanding this remains an alternative.

Figure 3B:
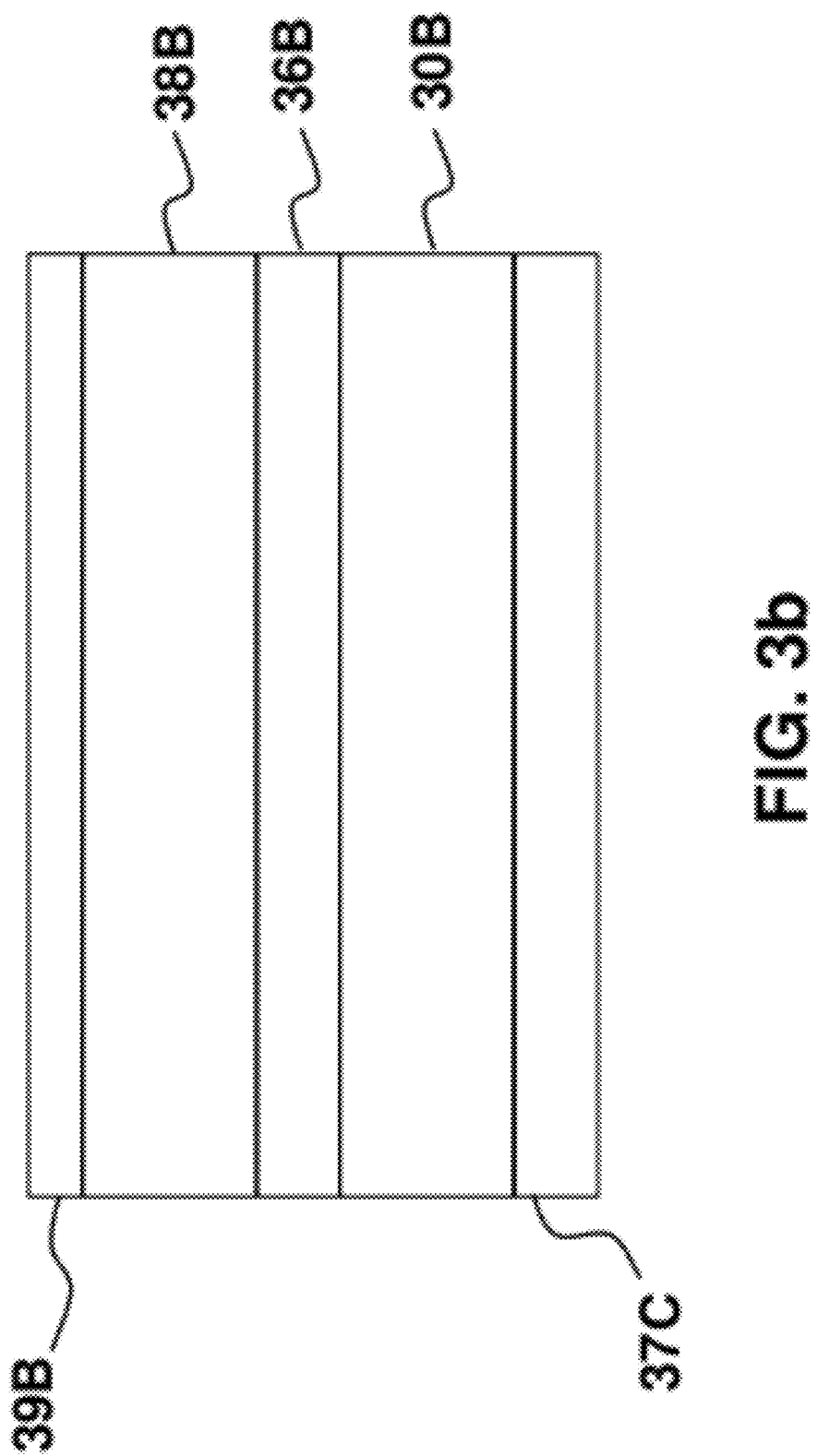
FIG. 3b shows a small segment of a color-shifting strand of this invention with a single unsymmetrical Fabry-Perot filter on one side of a transparent organic support layer and a reflector of the second side of the support layer.

Referring to FIG. 3b, a color-shifting strand is shown wherein an organic support layer 30b has a reflector coating 37c on a bottom surface and a Fabry-Perot structure with an absorber layer 39b a dielectric layer 38b and a reflector layer 36b on an upper surface.

Figure 3C:
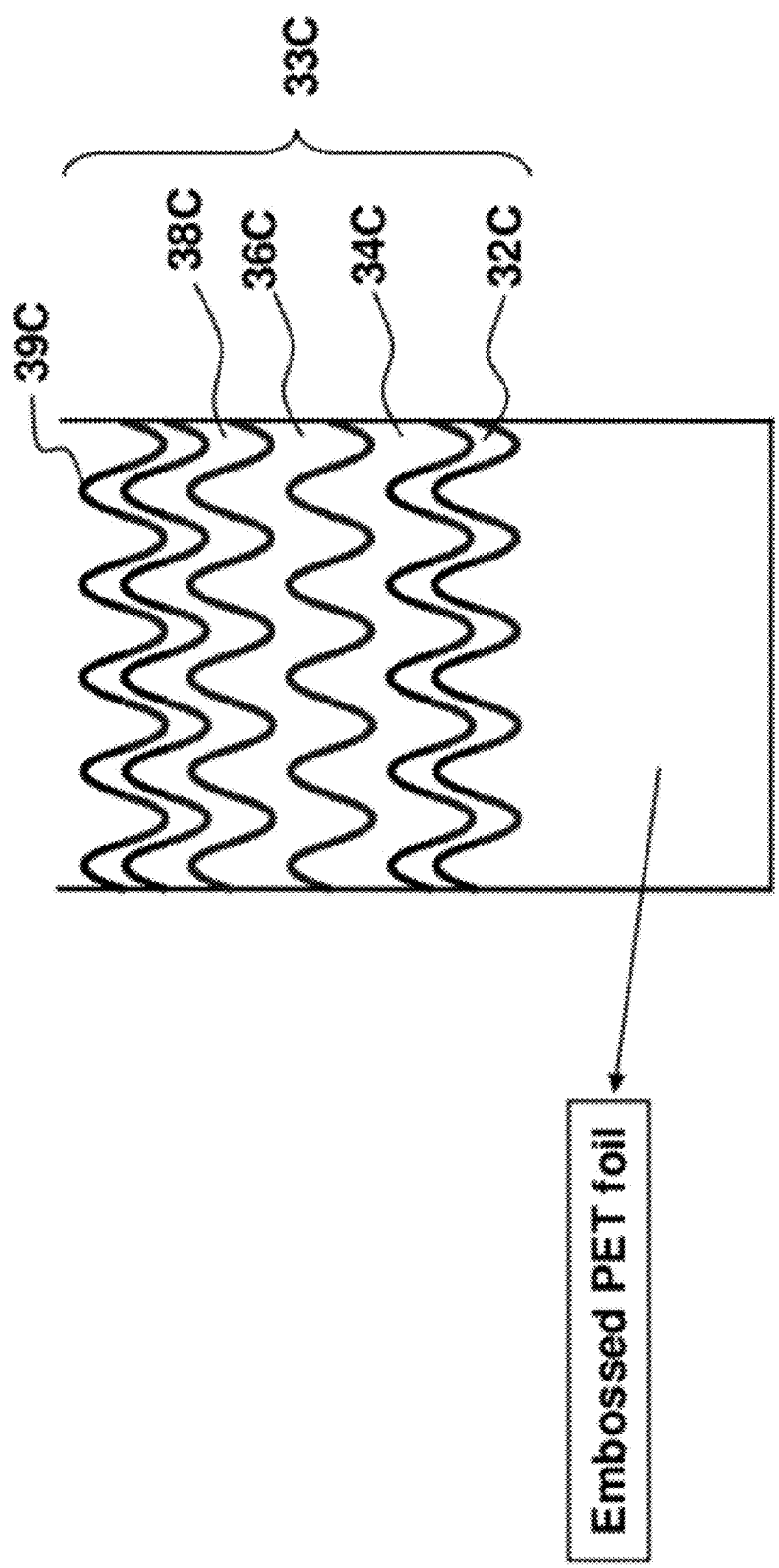
FIG. 3c shows a small segment of color-shifting strand of this invention with two single Fabry-Perot structures on the diffractive side of a transparent organic support layer where the two Fabry-Perot structures share a common reflector layer.

Referring to FIG. 3c, a color-shifting strand is shown with two single Fabry-Perot structures on the diffractive side of a transparent organic support layer where the two Fabry-Perot structures share a common reflector layer. The transparent organic substrate has a diffraction grating impressed therein, and the subsequent inorganic thin film layers deposited thereon, take the form of the grating yielding a structure which has diffractive effects as well as color-shifting thin film effects due to the absorber, dielectric and reflector layers. The symmetry of the deposited thin film layers about the central reflector layer provide thin optically variable effects when viewed from both sides if a transparent organic substrate is provided. The tendency of such as strand to chip or break during cutting is lessened considerably by having the thick stable organic layer as a support for the absorber, dielectric and reflector layers. When the two single Fabry-Perot structures are located on the non diffractive side of the support layer, the strand will show a combination of diffraction and thin film interference when seen from the grating side and only thin film interference when seen from the flat side. A fabricated product made of a plurality of strands will show a combination of these effects since statistically strand will approximately 50% of the time having the flat side showing and 50% of the time will show the diffractive side, unless care is taken to orient the strand with a particular side up.

Figure 4:
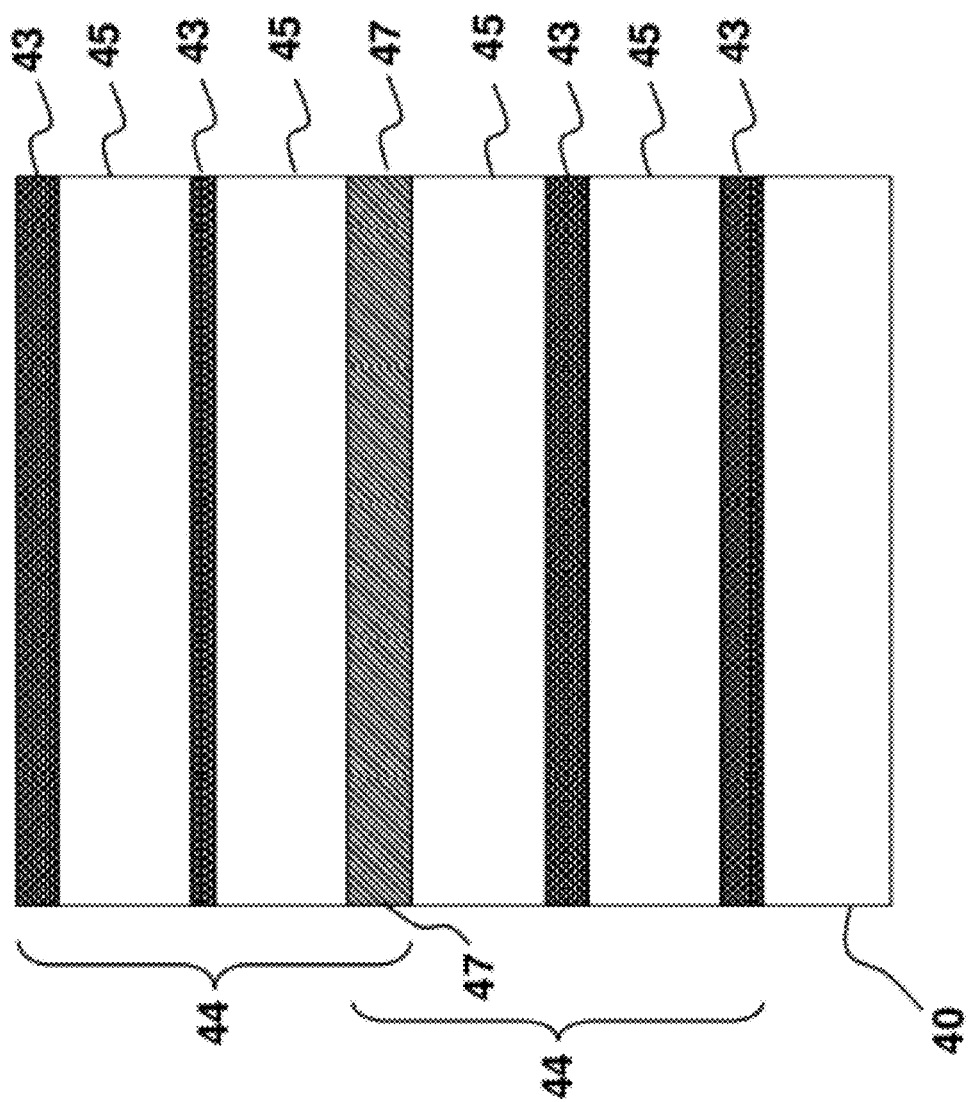
FIG. 4 shows a small segment of a color-shifting strand of this invention with two double period Fabry-Perot structures on one side of a transparent organic support layer. The two double period Fabry-Perot structures share a common reflector layer.
Figure 5:
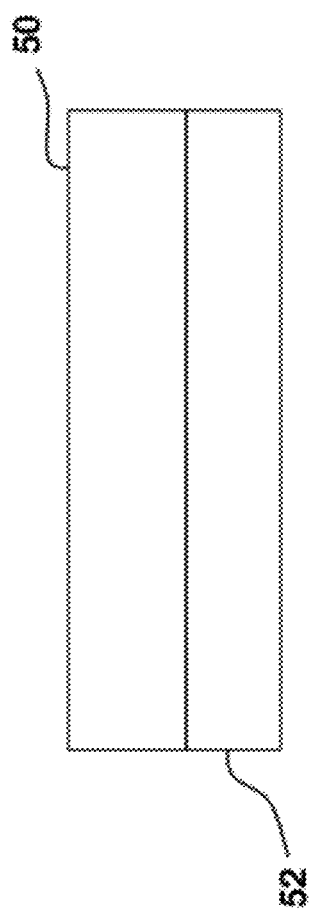
FIG. 5 shows a small segment of a color-shifting strand of this invention with a color-shifting ink on one side of an organic support layer.

FIG. 4 is an embodiment bearing two double Fabry-Perot filters 44 disposed upon a transparent organic support layer 40. Each of the double Fabry-Perot structures 44 have two absorber layers 43, two dielectric spacers 45, and share a reflector layer 47, centrally disposed between the double Fabry-Perot structures 44. The advantage of this embodiment over the embodiment depicted by FIG. 2 is that it is considerably easier to manufacture since only one side has to be coated. In FIG. 2, using conventional coating machines, the roll has to be removed from the vacuum coating chamber to coat the other side. Clearly, it is more economical to coat just one side. Another advantage of coating one side is that the non-coated side may be oriented up so as to protect the coating underneath. In all of these embodiments, no release layer is provided. The coating upon the substrate is intended to be a permanent coating, unlike the coating that used for providing color-shifting flakes.

An alternative embodiment of this invention is shown which is departure from the embodiments shown in FIGS. 1 through 4 described above. The strand shown in FIG. 5 consists of an organic support layer 50 having a color-shifting ink or paint 52 on one side of the support layer. By providing a transparent layer 50 the color-shifting ink or paint can be seen from both sides. Although this embodiment is color shifting with a change in viewing angle or change in direction of the light source, it is less reflective as a color-shifting strand than the afore-described embodiments which have a uniform flat reflecting layer.

Figure 6:
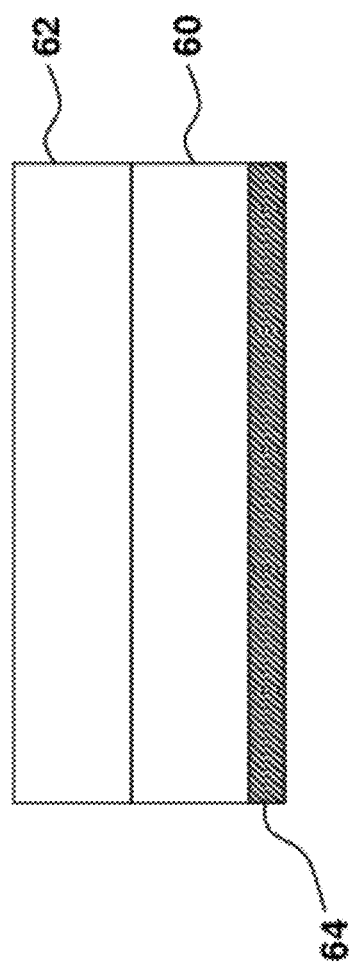
FIG. 6 shows a combination color-shifting strand of this invention wherein a reflector is on one side of the support layer and on the other side is an interference coating as depicted in FIGS. 1-5.

In FIG. 6 a depiction of an embodiment of the invention is shown wherein an organic support layer 60 supports one of the coatings 62 described in the previous embodiments. The other side of the organic support layer 60 is coated with a reflective coating 64.

This strand is highly reflective when viewed from the side with the reflective coating 64 and has optical variable properties when viewed from the other side having the coating 62.

Figure 7:
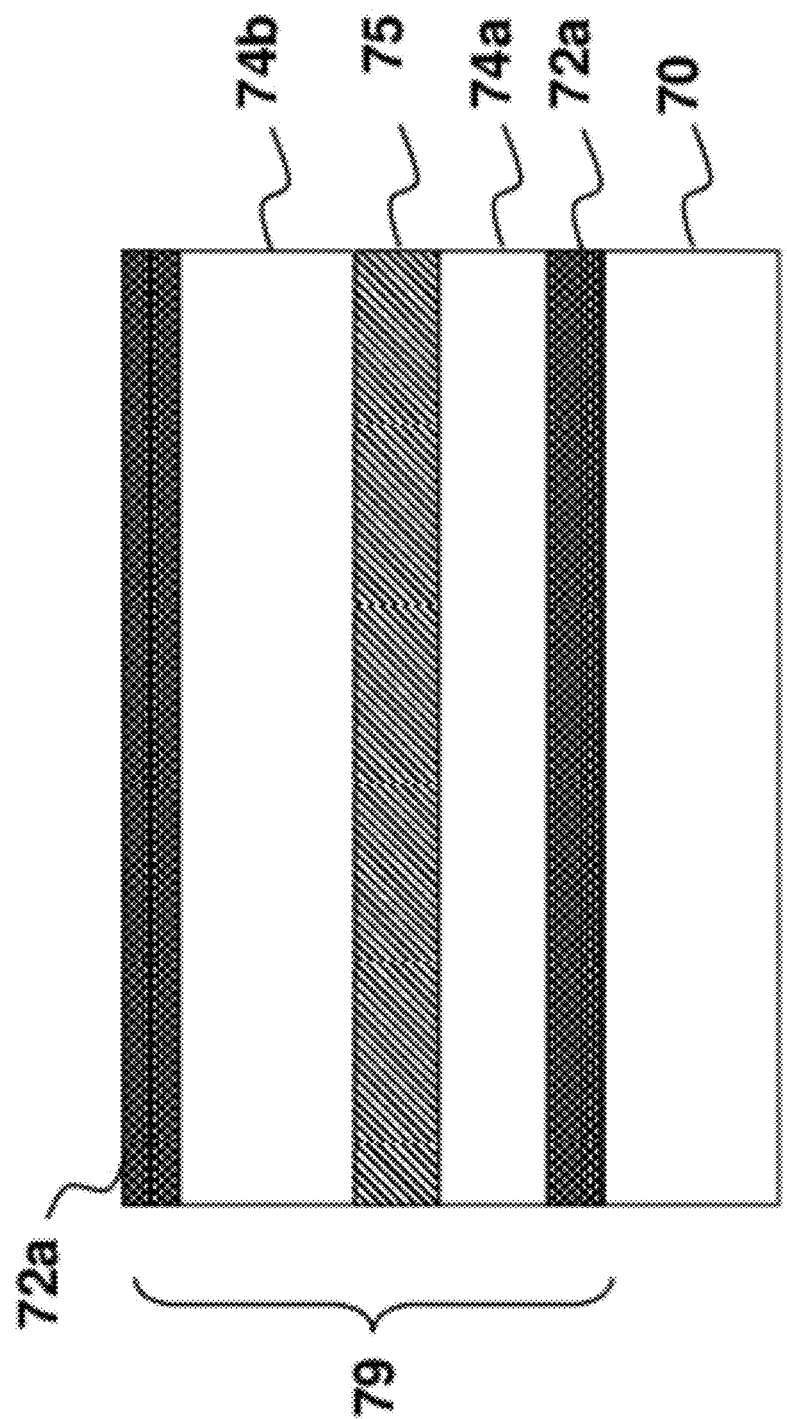
FIG. 7 shows an embodiment of the invention with two single period Fabry-Perot structures sharing the same reflector layer on one side of a transparent organic support layer wherein the thicknesses of the dielectric layers are substantially different.

FIG. 7 shows a color-shifting strand of this invention with two single-period Fabry-Perot structures 79 sharing the same reflector layer on one side of a transparent organic support layer 70. The double structure includes a transparent organic support layer, which supports absorber layer 72a, a dielectric spacer layer 74a, a reflector layer 75, a dielectric spacer layer 74b and an outer absorber layer 72a. It should be noted that the thickness of the dielectric layer 74a is different from the dielectric layer 74b. With a suitable combination of dielectric thickness, the strands can have the same color at one angle and two different colors when shifted to a different angle; (Metamerism by thin film interference). Because of the size of the strands, these two colors will be easily differentiated. This asymmetrical concept can be applied to the configurations corresponding to FIGS. 1 to 4.

In a preferred embodiment a roll-to-roll a double deposition system is employed as shown in FIG. 8. An un-wind reel 81a feeds organic sheet material 80 which passes under drums 83a and 83b to a wind-up reel 81b via a tension wheel 85, wherein simultaneous deposition of the absorber, dielectric and reflector layers can be achieved. By way of example, Source 1, may be a multi-pocket evaporation crucible that holds more than one material and the type of evaporation at Source 1 and Source 2 may be either resistive, electron beam or DC magnetron sputtering.

By forming a sheet that has any of the embodiments shown in FIGS. 1-7, the sheet material can be cut into strands. Here one simply removes the roll from the coating chamber and cuts the web into strands by using well known cutting machines.

Applications for this optically variable strand include labels, garments, upholstery, and toys but, not limited thereto.

Thus, this invention provides optically variable highly reflective strands having both excellent performance as color-shifting strands and which simultaneously, functions as highly reflective strands.

In order for multiple colors to be seen simultaneously, the color shifting strands must be woven into a warp that positions the strands such that they are somewhat sinusoidal in shape and such that the sinusoid or undulations are large enough such that plural colors are seen simultaneously.

Example 1

Samples were prepared as follows:

Gold to Silver (GO-SL), Blue to Red (BL-RD) and Red to Gold (RD-GO) optical variable thin film coatings were prepared as optically variable flake and optically variable strands. The designs were of the Fabry-Perot type having the structure: Cr/MgF2/Al/MgF2/Cr. The spacer layer thickness was adjusted to obtain the correct color-shift as per the known structures in the aforementioned patents.

Referring now to prior art FIG. 8, a standard weave is shown wherein warp provides a support structure through which the weft is woven. In accordance with this invention, a continuous color-shifting strand may form the weft or alternatively plural strands may be used to form the weft. Alternatively the weft and warp may be formed of color shift strands.

Figure 9:
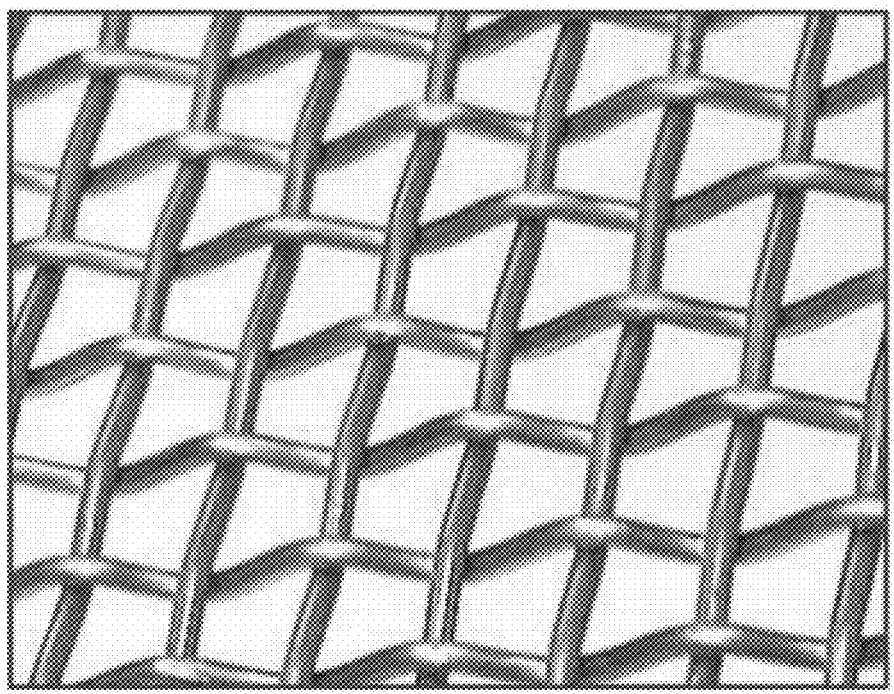
FIG. 9 is a photo of a prior art woven metal mesh material.

As opposed to weaving a flat metallic material, or flat reflective material, into a warp this invention provides a surprising and unexpected advantage. Because the color-shift thread follows and upward and downward path through the warp, over and under the supporting warp, viewing a textile made in this manner yields varying colors from the color-shifting strand even when the textile is stationary and the viewer's position is stationary. This is a function of an angle change of the color-shift thread weft interwoven into through the warp. As the angle changes according to stationary viewer so does the color change. A standard non-color shifting reflective metallic non-color shift weave would appear the same color perhaps showing darker and lighter regions. This is shown in FIG. 9 which is a photo of a woven metal mesh.

Of course numerous other embodiments may be envisaged without departing from the spirit and scope of the invention.

What is claimed is:

1. An opaque color-shifting element comprising:
a color-shifting strand cut such that its width is substantially less than its length, the strand comprising an inorganic thin film optical interference structure providing a perceivable color-shift with a change in viewing angle or angle of incident light, in the visible spectrum, wherein said inorganic thin film interference structure of the color-shifting strand is supported by an organic support layer for providing rigidity and for preventing the strand from significantly curling, and wherein the inorganic thin film interference structure is permanently coated onto the organic support layer in the absence of a release layer, wherein the inorganic thin film interference structure is only on one side of the organic support layer.

2. Opaque color-shifting element as defined in claim 1 wherein the strand has a thickness of at least 6 microns and is suitable for forming a textile.

3. Opaque color-shifting element as defined in claim 1, wherein the thin film interference structure is a Fabry-Perot interference structure and wherein the organic support layer is a light transmissive substrate which allows the Fabry-Perot interference color shifting effects to be seen from either side of the organic support layer, and wherein there is an absence of a Fabry-Perot structure on an opposite side from where the thin film interference structure resides.

4. Opaque color-shifting element as defined in claim 3, wherein the thin film interference structure includes two Fabry-Perot interference structures coated on a same side of the organic support layer arranged such that color-shift effects can be seen from both sides of the organic support layer.

5. Opaque color-shifting element as defined in claim 4, wherein the two Fabry-Perot structures share a common reflector layer.

6. Opaque color-shifting element as defined in claim 4 wherein the two Fabry-Perot structures are a five layer structure and are on a same side of the organic support layer.

7. Opaque color-shifting element as defined in claim 4 wherein the element forms a thread.

8. Opaque color-shifting element as defined in claim 4, wherein the Fabry-Perot structures each have an absorber layer and wherein the thicknesses of the absorber layers are substantially different.

9. Opaque color-shifting element as defined in claim 4, wherein the Fabry-Perot structures each have a dielectric layer and wherein the thicknesses of the dielectric layers are substantially different.

10. Opaque color-shifting element as defined in claim 1 wherein the inorganic thin film optical interference structure is a layer of optically variable ink.

11. An opaque color-shifting element as defined in claim 1, further comprising additional color-shifting strands, which together with the strand of claim 1 form a textile.

12. An opaque color-shifting element as defined in claim 11 wherein the additional color-shifting strands are cut such that their width is less than 500 microns, said additional color-shifting strands each comprising an inorganic thin film optical interference structure providing a perceivable color-shift with a change in viewing angle or angle of incident light, in the visible spectrum, wherein said inorganic thin film interference structure of each strand is supported by an organic support layer for providing rigidity and for preventing the strand from significant curling.

13. An opaque color-shifting strand as defined in claim 1 wherein additional color-shifting strands and the strand of claim 1 form a weft sharing a common warp.

14. An opaque color-shifting element as defined in claim 1, wherein the organic support layer has a diffraction grating or a holographic structure formed therein.

15. An opaque color-shifting element as defined in claim 14, wherein the diffraction grating or the holographic structure is formed on a surface of the organic support layer and wherein the inorganic thin film optical interference structure supported by the organic support layer has the diffraction grating or the holographic structure formed in at least a layer thereof.

16. An opaque color-shifting element as defined in claim 15, wherein the diffraction grating or the holographic structure is formed on a first face of the organic support layer and wherein the inorganic thin film optical interference structure is supported on an opposite face of the organic support layer.

17. An opaque color-shifting element as defined in claim 16, wherein the organic support layer is light transmissive and wherein the inorganic support layer comprises a color-shifting Fabry-Perot structure that can be seen from both sides of a strand.

* * * * *